Dec. 16, 1952 N. E. WAHLBERG 2,621,750
BRAKE AND CLUTCH SUPPORTING STRUCTURE
Filed Feb. 6, 1950 3 Sheets-Sheet 1
Fig. 1
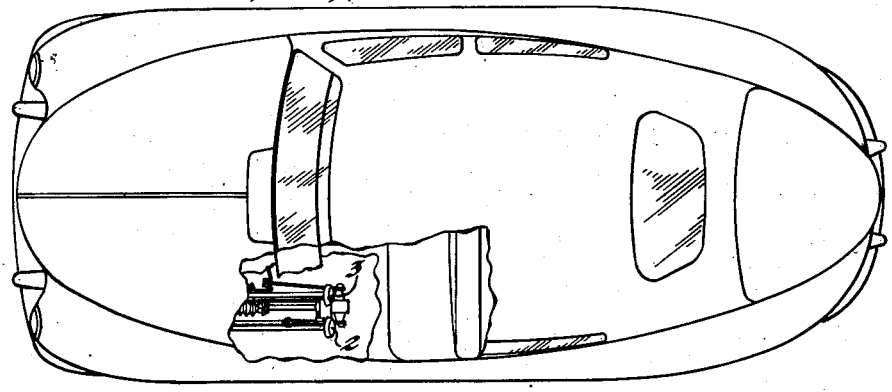
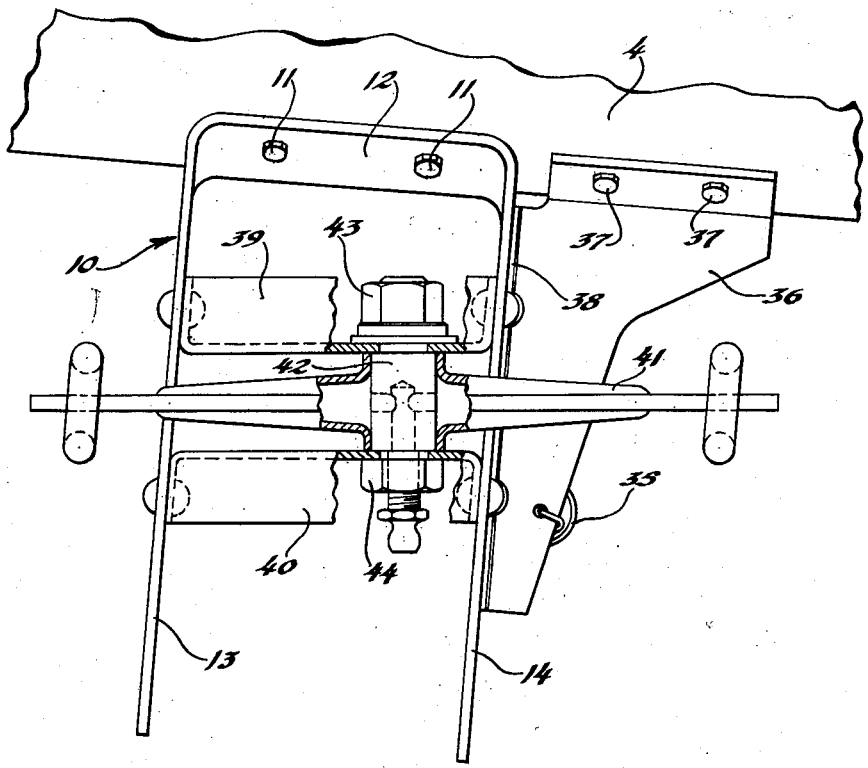
Fig. 4
NILS ERIK WAHLBERG
INVENTOR.
BY Carl J. Barbee
HIS ATTORNEY

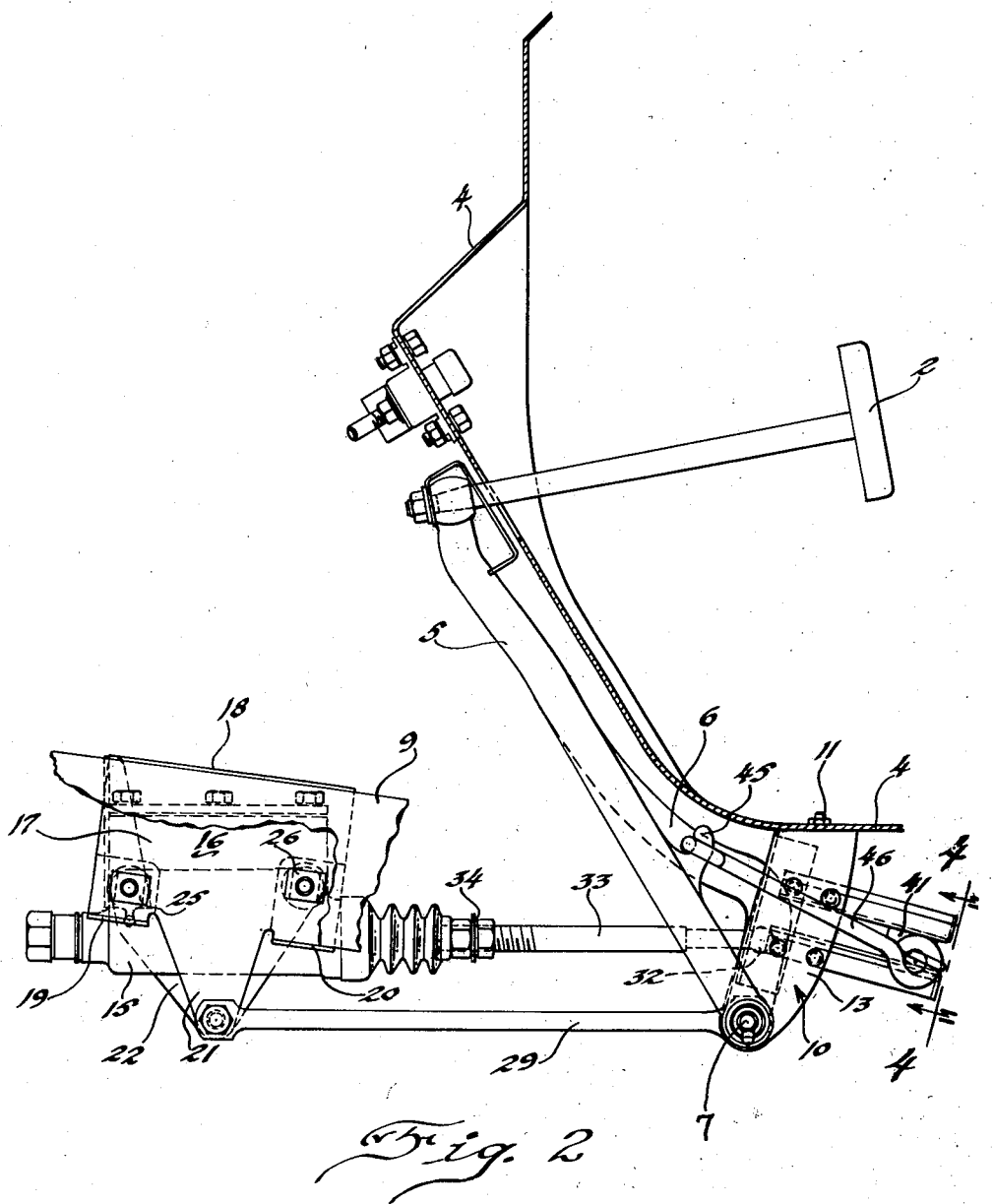

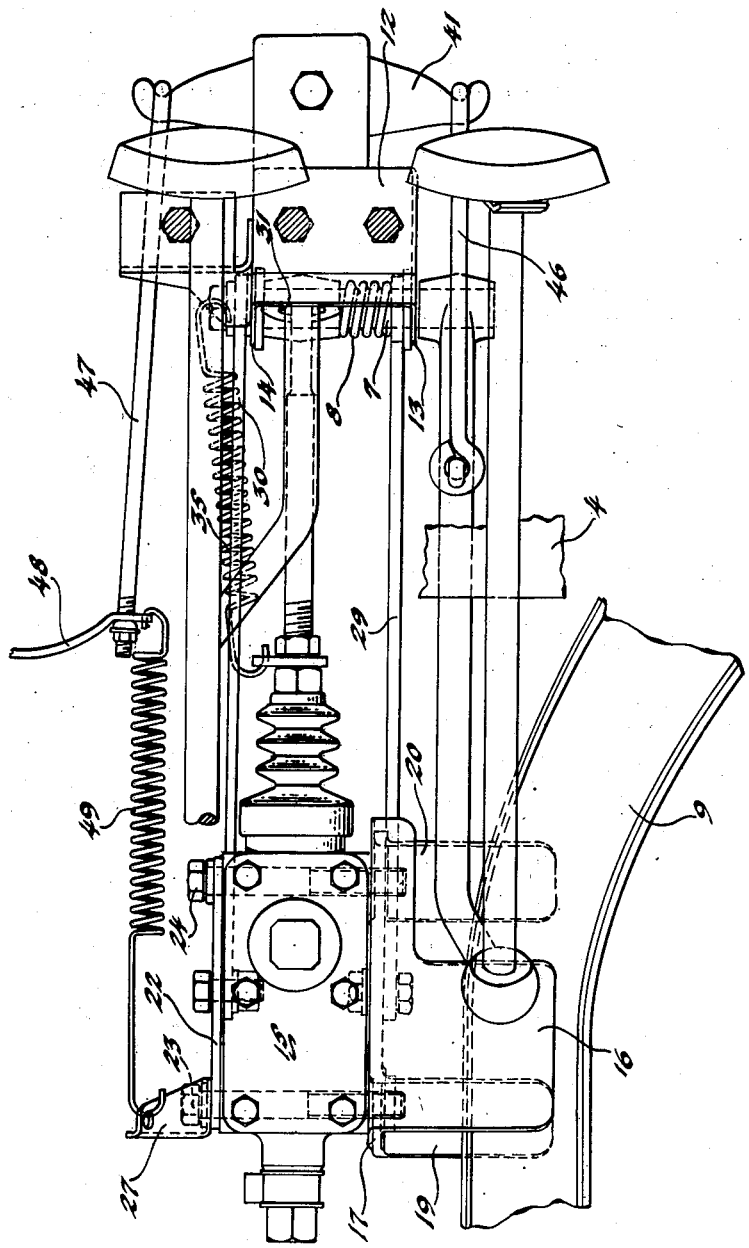

Patented Dec. 16, 1952

2,621,750

UNITED STATES PATENT OFFICE 2,621,750

BRAKE AND CLUTCH SUPPORTING STRUCTURE

Nils Erik Wahlberg, Chicago, Ill., assignor to Nash-Kelvinator Corporation, Kenosha, Wis., a corporation of Maryland Application February 6, 1950, Serial No. 142,545

12 Claims. (Cl. 180—77)

1

This invention relates generally to the arrangement of the various structural members which make up the overall supporting structure for the clutch and brake operation on a vehicle such as an automotive vehicle.

One object of the invention is to provide an improved apparatus for clutch operation.

Another object of the invention is to provide light and inexpensive supporting brackets so arranged as to provide the necessary support for clutch and brake operation.

A further object of the invention is the provision of novel mounting means for the brake master cylinder.

Other objects and advantages of the invention will be apparent upon reading the following specification and upon examination of the drawings, in which:

Figure 1 is a plan view of an automotive vehicle with a portion of the body panels broken away to disclose the invented subject matter.

Figure 2 is a side elevational view of the clutch and brake operating mechanism and the support members therefor;

Figure 3 is a plan view of the apparatus as shown in Figure 2, however, with the floor panel of the vehicle removed so as to disclose all of the operating parts; and Figure 4 is an enlarged view taken on line 4—4 of Figure 2 with the cross shaft and associated parts removed.

Referring to Figure 1, the invention is shown as it may be used on an automotive vehicle. The conventional clutch pedal 2 and brake pedal 3 extend through the floor panel 4 into the interior of the automotive vehicle and the operating mechanism which is actuated by pedals 2 and 3 is located beneath the floor panel 4.

In hitherto known constructions the supporting structure associated with the clutch and brake linkage operation included a bracket which was quite heavy and long whereby to provide a large fastening area so as to afford the necessary rigidity incident to brake operation. The main supporting bracket comprised a channel-shaped bracket with the bridging wall of said bracket fastened to the floor panel at a point about directly beneath the clutch and brake pedals, said bracket thence extending rearwardly as far as the nearest frame cross member, to which the rear end of the bracket was fastened. By using this long and heavy bracket with widely spaced fastening bolts, adequate rigidity was obtained and when a car driver in an emergency jammed his foot onto the brake pedal, said bracket was

2 sufficiently rigid to withstand this sudden force without twisting or distorting the floor panel (which, of course, is formed of thin sheet steel).

In the present construction this long and heavy bracket is dispensed with and my entire supporting structure incident to clutch and brake operation is so arranged that very little strain or force is transmitted to the floor panel.

Viewing Figure 2, the proposed construction is most clearly disclosed. The principal objective of the proposed construction is to provide mounting means which will relieve the floor panel of nearly all of the twisting and other forces incident, particularly, to abrupt braking actions resulting from emergency driving situations. The bracket 10 is secured to floor panel 4 by bolts 11. Bracket 10 thus provides a supporting connection between the clutch and brake levers and pedals and the floor panel 4. Viewing Figures 2 and 4, it will be noted that bracket 10 is a U-shaped stamping, comparatively small and lightweight. An additional bracket 36 (viewing Fgure 4) is secured to floor panel 4 by means of bolts 37 and has a side flange 38 adjacent and riveted to the depending tongue 14 of bracket 10. Bracket 36 thus lends rigidity to bracket 10 relative to floor panel 4, said rigidity, however, being concentrated principally in the direction which is crosswise of the car and which is also crosswise to the direction of movement of the brake pedal 2 and its attached operating lever 6. The clutch and brake levers 5 and 6 are pivotally mounted on a cross shaft 7, which shaft is carried by the depending tongues 13 and 14 of bracket 10. A spring 8 maintains the clutch and brake operating arms 5 and 6 in the desired spaced relation to each other. Viewing Figure 2, it can be seen that bracket 10 does not offer much rigidity in conjunction with the thin floor panel 4, particularly with respect to any forward or rearward forces (in the direction lengthwise of the car) which might be imposed upon the bracket 10. Force resisting rigidity, twisting or otherwise, is adequately supplied in the mounting of the master cylinder 15 relative to frame member 9 (the channel-shaped frame member 9, of course, being much more rigid than the thin floor panel 4). A bracket 16 is formed as a stamping having a base portion 17 and an upper tongue 18 and a pair of lower spaced tongues 19 and 20, which tongues embrace the frame member 9 and may be welded or otherwise rigidly secured thereto as by means of bolts. Formed as part of bracket 16 is a downwardly depending tongue 21 which is interposed between the lower tongues 19 and 20 and which is actually a downwardly depending continuation of the base portion 17.

On the side of the master cylinder 15, opposite bracket 16, is another bracket 22 which may be substantially triangular-shaped as indicated in Figure 2. A pair of bolts 23 and 24 extend through the body of the master cylinder 15 and thence into the base portion 17 of bracket 16, thereby rigidly securing the bracket 22 and the master cylinder 15 to bracket 16. If desired, clinch nuts 25 and 26 may be used on the ends of the bolts 23 and 24. The bolt 23 also secures bracket 27 adjacent bracket 22.

A pair of tension arms 29 and 30 are mounted on the cross-shaft 7 and arm 29 is secured to the downwardly depending tongue 21 of bracket 16 and arm 30 is secured to the lower end of bracket 22. Thus the cross-shaft 7, which carries the clutch and brake operating arms 5 and 6, receives its principal support from bracket 10, which is secured to floor panel 4 and additional rigidity is imparted to cross-shaft 7 through the arms 29 and 30 which link the cross-shaft 7 to the supporting brackets 16 and 22.

It will be noted that the brake operating rod 33 is positioned close to tension arms 29 and 30 (viewing Figure 2) and is positioned substantially midway between said tension arms 29 and 30 (viewing Figure 3). The brake operating lever 6 (viewing Figure 2) has a substantially right angular kink formed in it near the point where said lever 6 is mounted on cross shaft 7. A socket is formed in said lever 6 just below the kink and receives the ball member 32, which is formed on the end of brake operating rod 33. Viewing Figure 2, it will be noted that a vertical line drawn through the axis of cross shaft 7 would fall in front of the ball member 32. Thus when the brake pedal is pushed toward the floor board, lever 6 swings about cross shaft 7 in the direction of master cylinder 15 and ball member 32 and operating rod 33 moves in a slightly arcuate path about the axis of cross shaft 7, however, said movement is principally a longitudinal movement of the rod 33 toward master cylinder 15. Normally the brake operating rod 33 only moves a short distance (one-half to three-quarters of an inch or so) during brake operation and, consequently, the movement of brake operating rod 33, as aforesaid, is substantially a straightforward longitudinal movement toward master cylinder 15. The drawings being about half size, it can be seen in viewing Figure 2 that ball 32 would move only slightly beyond the imaginary vertical line drawn through the axis of cross shaft 7. A car driver who abruptly jams the brake pedal during an emergency situation imparts a great amount of force by means of lever 6, which force must be resisted by adequate rigid supporting structure. This force is transmitted through brake operating rod 33 substantially in a lengthwise direction of the car toward the master cylinder 15, and against the fluid "columns" (not shown) which lead from the interior of the master cylinder 15 to the conventional braking mechanisms (not shown). Cylinder 15 and its associated supporting structures, brackets 16 and 22 and frame member 9, thus resist substantially the entire force imparted by lever 6 through the medium of the tension arms 29 and 30. The thrust which is imparted to brake operating rod 33 by forward movement of lever 6 causes an equal rearward thrust toward bracket 10, however, this rearward thrust is imposed on the tension arms 29 and 30 and not on bracket 10. This pull on the tension arms 29 and 30 is adequately resisted by the rigid brackets 16 and 22, cylinder casting 15, and frame member 9.

It will be noted that the force exerted on the tension arms 29 and 30 is exerted in a direction substantially longitudinally of said arms, consequently the arms are not subjected to any appreciable amount of side thrusts which would tend to twist or bend the arms. This is due to the fact that brake operating rod 33 is positioned close to arms 29 and 30 and the action which takes place is similar to that of a man attempting to pull himself up by his own boot straps. The positioning of brake operating rod 33 substantially midway between connecting arms 29 and 30 (viewing Figure 3) is, of course, important in the effecting of the "boot strap" action as well as tending to eliminate sidewise thrusts on bracket 10. The side thrusts on bracket 10, however, are adequately resisted by the combination of brackets 10 and 36 and the comparatively great spacing between the farthest fastening bolt 11 and the farthest fastening bolt 37. A washer 34 receives one end of a tension spring 35 for effecting return of the brake pedal 3 after it has been depressed.

The clutch operating lever 5 is mounted on the outer end of cross shaft 7, since the amount of force incident to clutch operation is very small compared to the amount of force incident to brake operation. A jamming of the clutch pedal merely results in said pedal encountering the floor board, which floor board thus absorbs substantially all of this abrupt thrust and very little of said thrust thus reaches supporting brackets 10, 16, and 22. In clutch operation, however, this same "boot strap" action takes place except that the man's foot (clutch lever 5) is outside of the "boot straps" (arms 29 and 30).

A pair of cup-shaped stampings 39 and 40 may be riveted or otherwise secured to the depending tongues 13 and 14 of bracket 10 in spaced relation to each other. A swingle-tree type of arm 41 is pivotally mounted on bolt 42 which is secured to stampings 39 and 40 by means of nuts 43 and 44. The clutch operating arm 5 has a hook 45 formed thereon and a connecting link 46 is provided with an eye at each end for connecting the swingle-tree 41 to the clutch operating arm 5. A link member 47 connects the second clutch operating arm 48 with the swingle-tree 41 whereby movement of clutch operating arm 5 is imparted to the second clutch operating arm 48 through the links 46 and 47 and swingle-tree 41. A tension spring 49 is secured at one end to clutch arm 48 and at the opposite end to bracket 27 and functions to return clutch pedal 2 after said pedal has been depressed and then released. It will be understood that the clutch operating arm 48 is associated with a conventional clutch throwout bearing (not shown) which is actuated to engage and disengage the main engine clutch (not shown) of the automotive vehicle.

Having thus described my invention, what I claim is:

1. In a supporting structure for clutch operation on a vehicle, wherein clutch operation is effected by means of arms and linkage associated with a swingle-tree type of lever adapted to transmit the movement of one arm to the clutch operating arm, said supporting structure comprising a floor panel member, a bracket having a bridge portion secured to the panel member and spaced tongues depending from the bridge portion, a pair of additional brackets spaced from each other and interposed between and being secured to the depending tongues, the free ends of said additional brackets carrying the swingle-tree type of lever.

2. In a supporting structure for clutch operation on a vehicle, wherein clutch operation is effected by means of a linkage assembly and wherein the supporting structure is attached to the floor panel of the vehicle, comprising a U-shaped bracket having a bridge portion secured to the panel member and spaced tongues depending from the bridge portion, a pair of stampings spaced from each other and interposed between and being secured to the depending tongues, the linkage assembly being carried by the stampings.

3. A supporting structure for mounting clutch and brake controls on a vehicle wherein the supporting structure is principally carried by a frame member and the floor panel of the vehicle, comprising a bracket secured to and depending from the floor panel, a cross rod carried by the bracket, additional brackets secured to the frame member and a pair of support arms interconnecting the floor panel bracket and the frame member brackets.

4. A supporting structure for mounting clutch and brake controls on a vehicle wherein the supporting structure is principally carried by a frame member and the floor panel of the vehicle, comprising; a bracket secured to and depending from the floor panel, a bracket secured to the frame member and being spaced from the first bracket, and an arm extending between the brackets.

5. A supporting structure for supporting the clutch and brake operating arms of a vehicle and for supporting the master cylinder of the braking system, comprising a bracket secured to the floor panel of the vehicle, a pair of brackets on opposite sides of the master cylinder, one of said latter brackets being secured to a frame member of the vehicle, and a pair of reinforcing arms extending between the floor panel bracket and the master cylinder brackets to form an overall supporting structure.

6. A supporting structure for mounting clutch and brake controls on a vehicle wherein the supporting structure is principally carried by a frame member and the floor panel of the vehicle, comprising a U-shaped bracket secured to and depending from the floor panel, a cross rod carried between the tongues of said U-shaped bracket, a pair of support arms each mounted at one end on the cross rod in spaced relation to each other, the opposite ends of said arms being secured to the frame member of the vehicle.

7. A supporting structure for mounting clutch and brake controls on a vehicle wherein the supporting structure is principally carried by a frame member and the floor panel of the vehicle, comprising a bracket having a bridge portion and downwardly depending spaced tongues, said bridge portion being secured to the floor panel, a cross rod carried between the tongues, a pair of support arms each mounted at one end on the cross rod in spaced relation to each other, a second bracket secured to a frame member of the vehicle and a third bracket spaced therefrom, said support arms being secured one to each of said last mentioned brackets.

8. A support bracket formed of a single stamping having a bridge portion and a substantially right angularly extending tongue portion, a pair of tongue portions emanating from the bridge portion in the same general direction as the first mentioned tongue portion thereby being substantially parallel to the first tongue portion and substantially right angular to the bridge portion, and a fourth tongue portion positioned between the second and third tongues and extending outwardly from the bridge portion in the plane of said bridge portion.

9. In a supporting structure for clutch operation on a vehicle, a floor panel, a bracket secured to the floor panel, said bracket having spaced tongues depending from the floor panel, a pair of brackets spaced from each other and being secured to each of the depending tongues, a swingle-tree carried between the pair of brackets, a cross rod spanning the tongues and carried thereby, a clutch operating arm, a second arm carried by the cross rod, a link connecting one end of the swingle-tree with the clutch operating arm and a link connecting the other end of the swingle-tree with the arm carried by the cross rod whereby movement of the second arm is transmitted to and causes a correlative movement of the clutch operating arm.

10. A supporting structure for supporting the brake operating arm on a vehicle wherein the supporting structure is principally carried by a frame member and the floor panel of the vehicle and wherein a master cylinder has an operating rod extending therefrom, comprising: a bracket secured to the floor panel and depending therefrom and carrying the brake operating arm, a tension arm extending from the bracket to the frame member, said tension arm extending in a direction substantially parallel to the operating rod and adjacent to said rod.

11. A supporting structure for supporting the brake operating arm on a vehicle wherein the supporting structure is principally carried by a frame member and the floor panel of the vehicle and wherein a master cylinder is rigidly carried by the frame member and an actuating rod extends outwardly from the master cylinder, comprising: a bracket secured to the floor panel and having spaced tongues depending therefrom, a cross member spanning the tongues and carried thereby, said brake operating arm being pivotally mounted on the cross member and having engagement with the actuating rod, tension arms spaced from each other and extending from the bracket to the frame member and being rigidly secured thereto, said actuating rod being substantially in parallel alignment with the tension arms and being positioned between said arms and adjacent thereto whereby force exerted on the actuating rod is resisted by the tension arms and the direction of resistance is substantially in longitudinal alignment with the arms.

12. A brake operating mechanism for a vehicle comprising a floor panel, a frame member, a brake operating arm, a master cylinder, an actuating rod extending from the master cylinder to the brake operating arm, a bracket secured to the floor panel and having spaced tongues depending therefrom, a cross shaft spanning the tongues and being carried thereby, said brake operating arm being pivotally mounted on the cross shaft, spaced tension arms extending from the depending tongues to the frame member and being rigidly secured thereto, said actuating rod lying in a plane near the plane ascribed by the tension arms and said actuating rod being positioned between and extending longitudinally in substantial parallel alignment with the tension arms, whereby force exerted on the actuating rod in a direction toward the master cylinder is resisted principally by the tension arms in a direction toward the cross shaft.

NILS ERIK WAHLBERG.

REFERENCES CITED

The following references are of record in the file of this patent:

UNITED STATES PATENTS

| Number | Name | Date |
|---|---|---|
| 900,545 | Humiston | Oct. 6, 1908 |
| 1,686,716 | Thomas | Oct. 9, 1928 |
| 2,207,328 | McGrane | July 9, 1940 |
| 2,311,997 | Pearson | Feb. 23, 1943 |